US008001223B2

(12) United States Patent
Yeap et al.

(10) Patent No.: US 8,001,223 B2
(45) Date of Patent: *Aug. 16, 2011

(54) AUTOMATIC SWITCHING NETWORK POINTS BASED ON CONFIGURATION PROFILES

(75) Inventors: Yuen-Pin Yeap, Cupertino, CA (US); Yadong Zhang, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/583,097

(22) Filed: Aug. 14, 2009

(65) Prior Publication Data

US 2009/0313359 A1 Dec. 17, 2009

Related U.S. Application Data

(63) Continuation of application No. 11/261,061, filed on Oct. 27, 2005, now abandoned, which is a continuation of application No. 09/569,576, filed on May 10, 2000, now Pat. No. 6,961,762.

(60) Provisional application No. 60/182,391, filed on Feb. 14, 2000.

(51) Int. Cl.
 *G06F 15/177* (2006.01)
(52) U.S. Cl. .................................................. 709/221
(58) Field of Classification Search .................. 709/220, 709/221, 224
See application file for complete search history.

(56) References Cited

U.S. PATENT DOCUMENTS

| | | | |
|---|---|---|---|
| 5,557,748 | A | 9/1996 | Norris |
| 5,724,346 | A | 3/1998 | Kobayashi et al. |
| 5,918,016 | A | 6/1999 | Brewer et al. |
| 5,974,236 | A | 10/1999 | Sherman |
| 5,991,287 | A | 11/1999 | Diepstraten et al. |
| 6,006,090 | A | 12/1999 | Coleman et al. |
| 6,119,162 | A | 9/2000 | Li et al. |
| 6,205,448 | B1 | 3/2001 | Kruglikov et al. |
| 6,295,556 | B1 | 9/2001 | Falcon et al. |
| 6,363,423 | B1 | 3/2002 | Chiles et al. |
| 6,434,627 | B1 | 8/2002 | Millet et al. |
| 6,493,751 | B1 | 12/2002 | Tate et al. |
| 6,498,779 | B1 | 12/2002 | Michaud et al. |
| 6,671,735 | B1 | 12/2003 | Bender |

FOREIGN PATENT DOCUMENTS

WO WO 99/46890 9/1999

OTHER PUBLICATIONS

Tourrilhes, "Wireless LANs in use", http://www.hpl.hp.com/personal/JeanTourrilhes/Linux/Linux.Wireless.usage.html, Mar. 6, 2000, pp. 1-8.
Tourrilhes, "Wireless Overview—Anatomy of a radio LAN", http://www.hpl.hp.com/personal/JeanTourrilhes/Linux/Linux.Wireless.wllan.html, Mar. 16, 2000, pp. 1-4.
"IBM 2480-E00 Wireless Ethernet LAN Access Point", http://www.capta.com.mx/folletos/2480-E00.htm, Mar. 16, 2000, pp. 1-3.
Prospectus, "Dr. Farallon's Guide to Wireless LAN Connectivity", Farallon Communications, San Leandro, CA, 1999, pp. 1-16.
Installation Guide, "Compaq WL 400 Wireless LAN Hardware Access Point", Compaq Computer Corporation, U.S.A., Oct. 1999.
Droms, "Dynamic Host Configuration Protocol", Bucknell University, Ohio, USA, Oct. 1993, pp. 1-33 (http://www.cis.ohio-state.edu/htbin/rfc/rfc1541.html, May 7, 2000).

*Primary Examiner* — Jeffrey Pwu
*Assistant Examiner* — Scott M Sciacca
(74) *Attorney, Agent, or Firm* — Gunnison, McKay & Hodgson, L.L.P.; Philip McKay

(57) ABSTRACT

A method and apparatus to reconfigure parameters for establishing a link with a new host after a computer is moved to a new location or a new network.

20 Claims, 6 Drawing Sheets

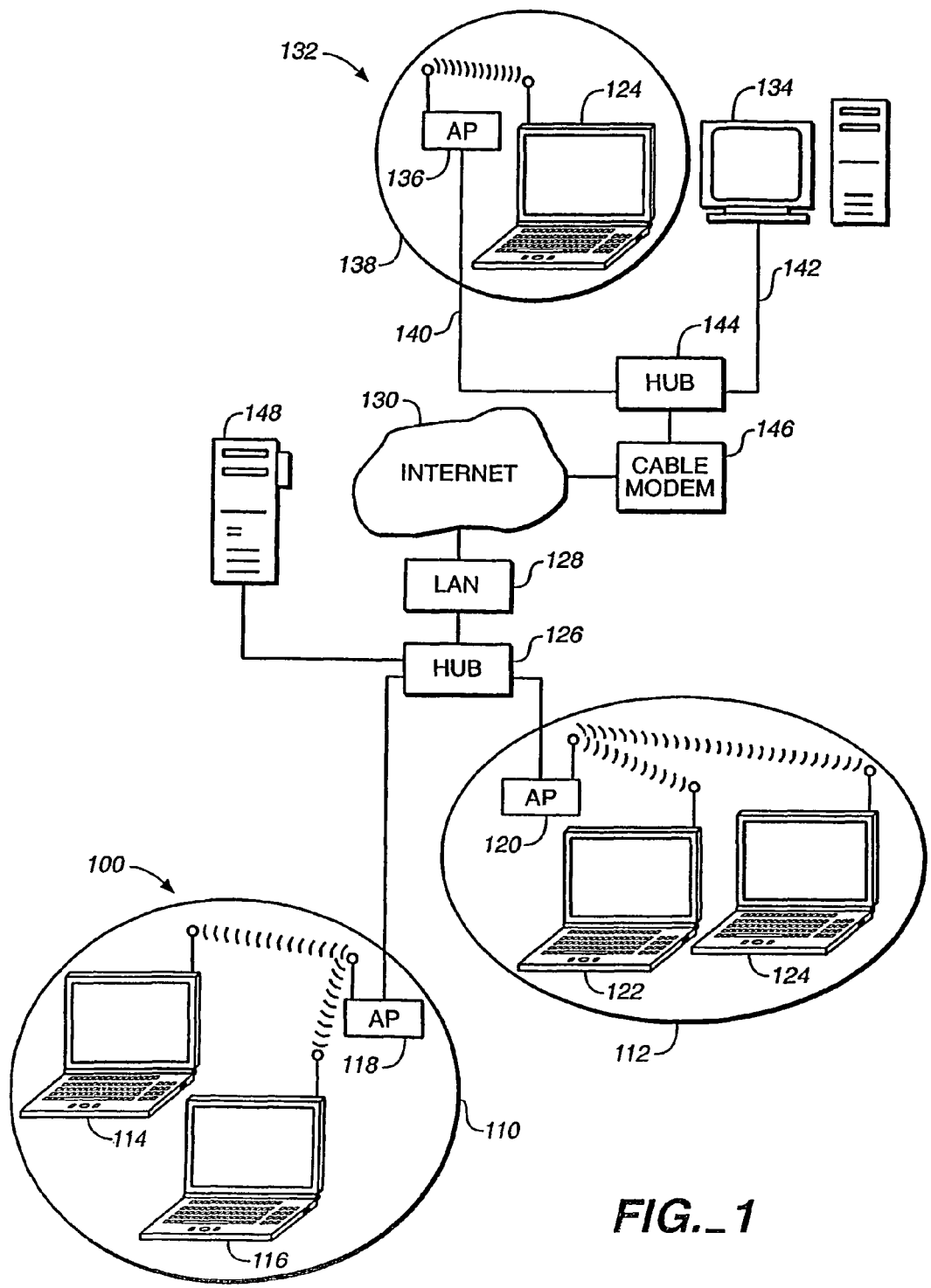
FIG._1

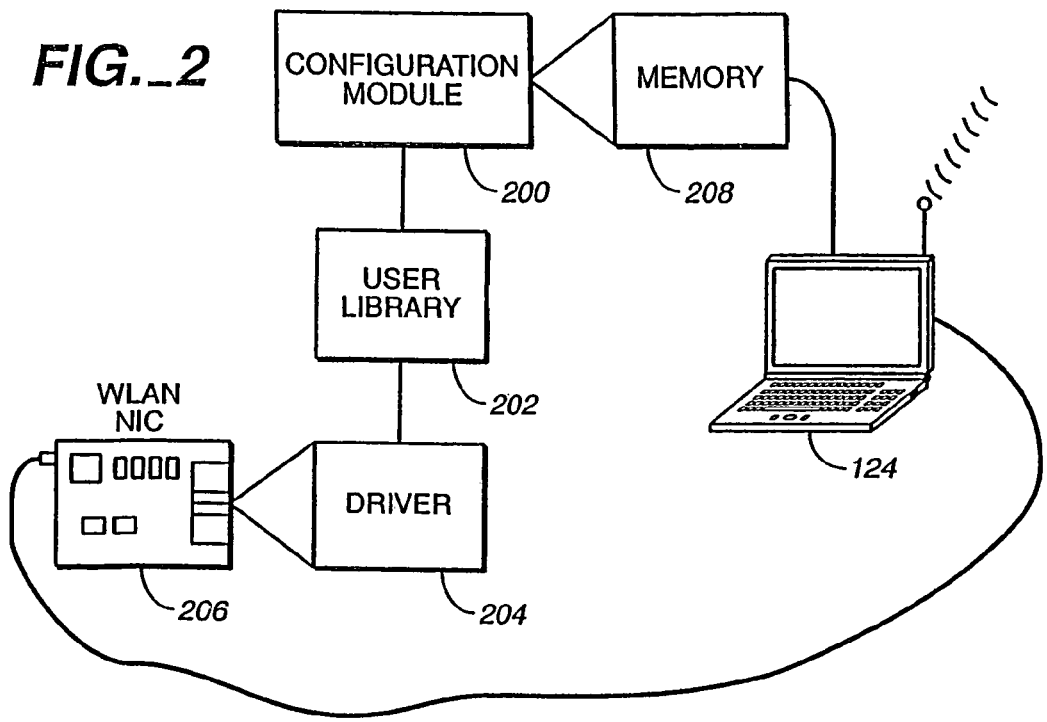
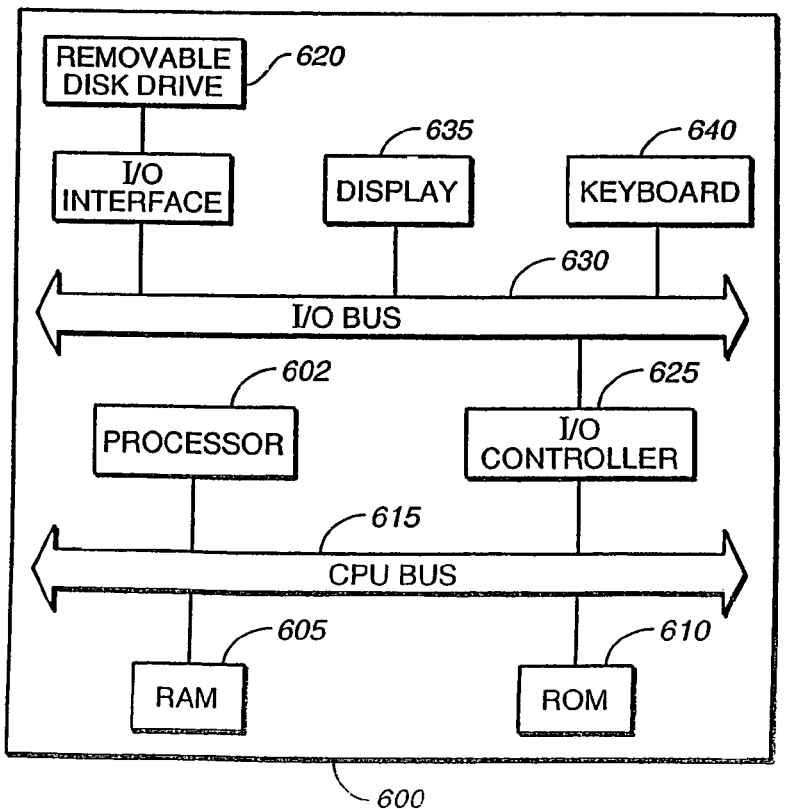

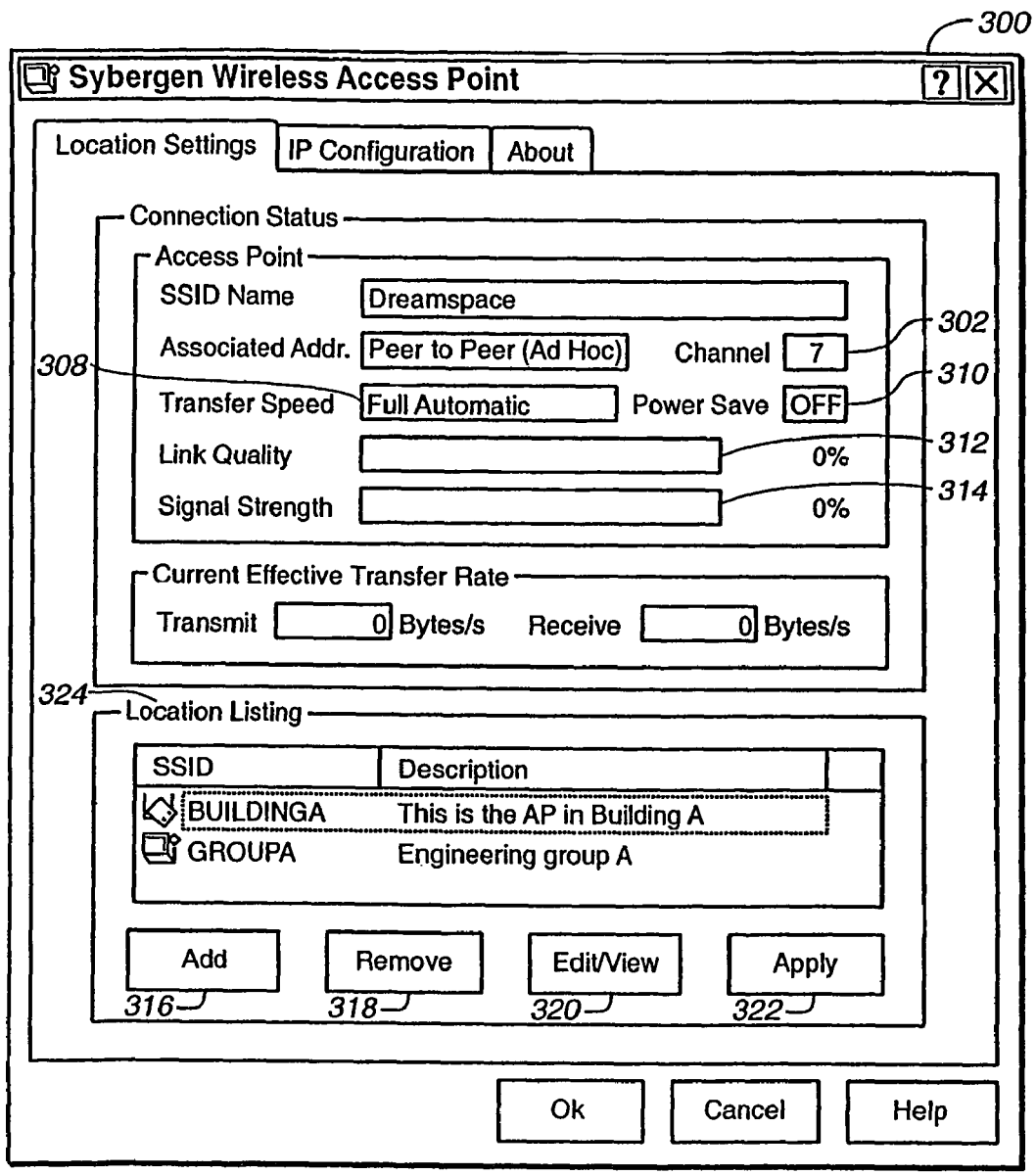
FIG._3

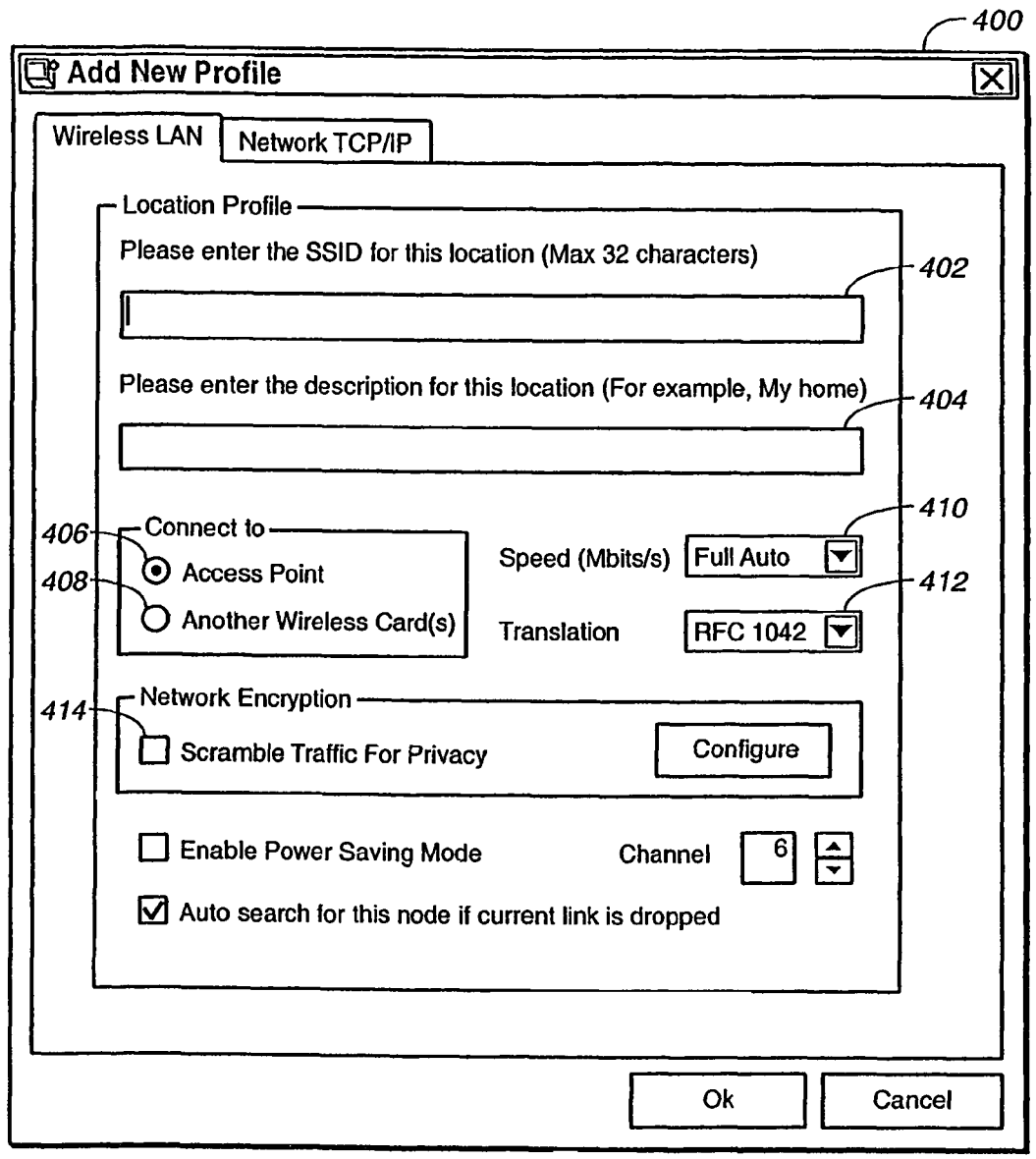
FIG._4A

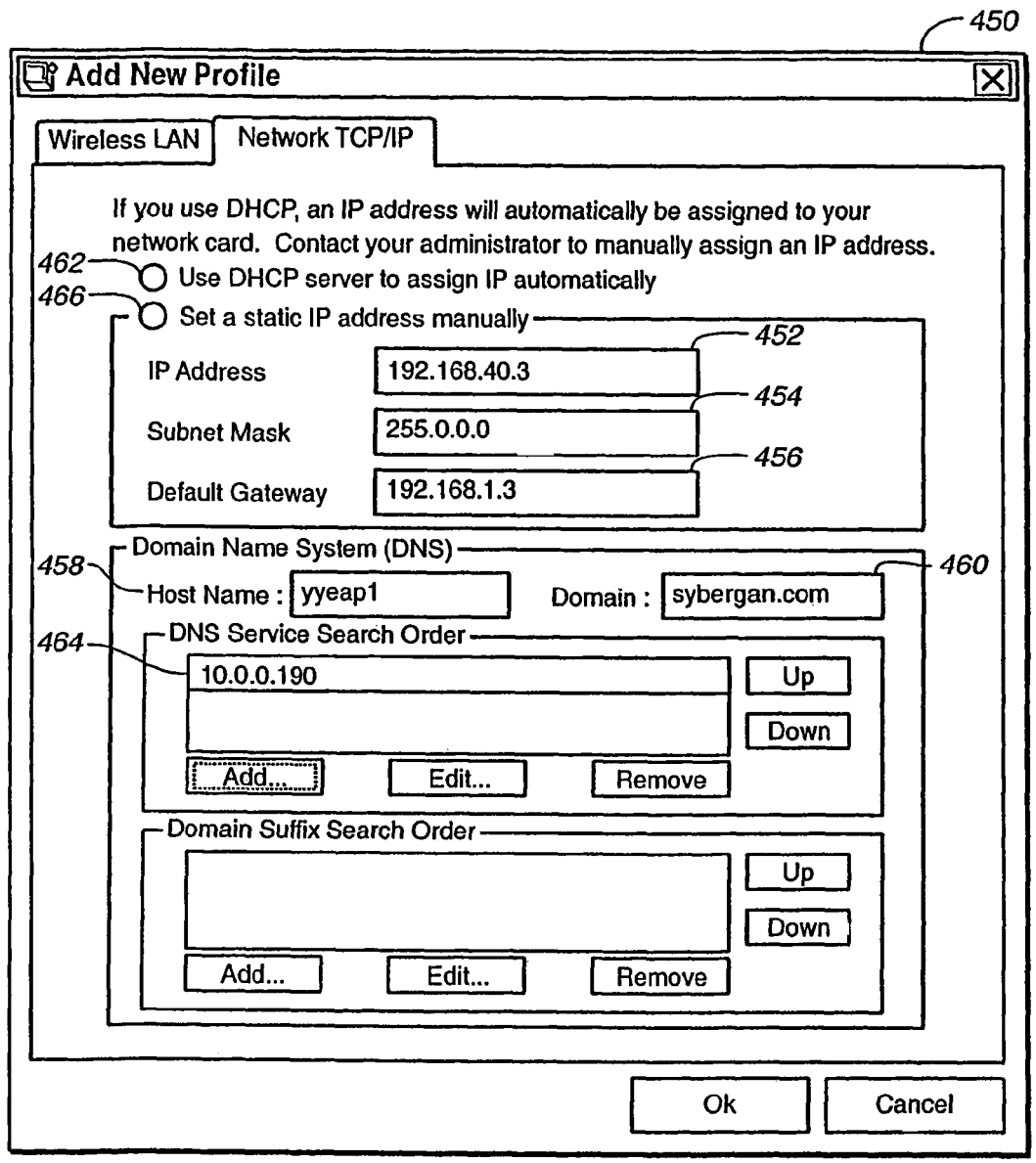
FIG._4B

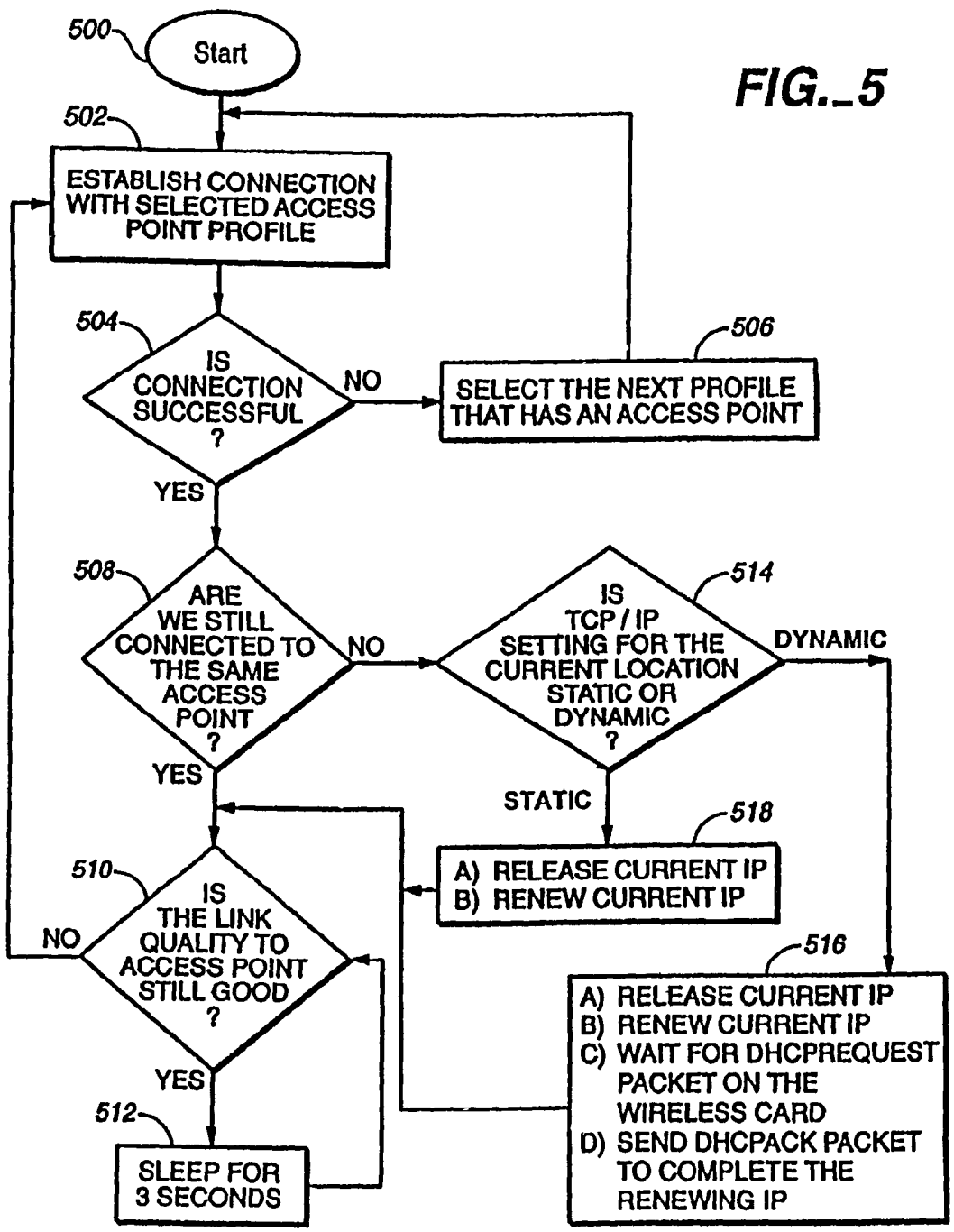
FIG._5

AUTOMATIC SWITCHING NETWORK POINTS BASED ON CONFIGURATION PROFILES

CROSS-REFERENCE TO RELATED APPLICATIONS

This application is a continuation of U.S. patent application Ser. No. 11/261,061, filed on Oct. 27, 2005, which is a continuation of U.S. patent application Ser. No. 09/569,576, filed on May 10, 2000, now U.S. Pat. No. 6,961,762, issued on Nov. 1, 2005, which claims the benefit of the earlier filing date of U.S. Provisional Application No. 60/182,391, filed Feb. 14, 2000, all of which are incorporated herein by reference.

TECHNICAL FIELD

This invention relates generally to providing wireless network access, and more particularly to automatic reconfiguration of hardware and network parameters for a mobile computer in a wireless network.

BACKGROUND

There are growing demands for mobile Internet access. Conventional computer systems are commonly configured in local area networks. A mobile computer may use a standard PCMCIA network card to connect to the local area network. The PCMCIA network card typically includes a telephony modem that can be physically connected by network cable to a telephone line. Once connected, nodes within the network communicate with one another through air and space using radio, microwave, and infrared frequencies in the megacycle/second or kilomegacycle/second ranges, or through other well-known techniques in the field such as point-to-point laser systems. However, the network cable connection restricts the computers' mobility because these computers need to be physically connected to a "hub" or "port."

One promising solution for providing network access to mobile computers is the Wireless Network Interface Card (WNIC). The WNIC eliminates the need for network cables, and thus allows for more user mobility. Armed with a WNIC, a node in the wireless network, such as a notebook computer, can be as far as 150 feet away from the rest of the network, depending on the composition and thickness of the walls in the building where the wireless local area network (WLAN) is deployed. The WNIC cards communicate with one another through radio waves, and the transmission rate can be as high as 11 Mbps.

The WNIC works in two modes: infrastructure mode and ad hoc mode. In the infrastructure mode, a WNIC communicates with the network through an Access Point (AP) devices. In the ad hoc mode, the WNIC's communicate with one another directly without using AP devices.

Despite the mobility, nodes equipped with a WNIC still face problems regarding hardware and network configurations. When a mobile computer moves between multiple AP devices, or switches from infrastructure mode to ad hoc mode, the mobile computer is typically disconnected and then reconnected. The mobile computer subsequently needs to be manually reconfigured by the user for proper connection to a new system. Therefore, there exists a need for a method and apparatus to automatically reconfigure the WNIC contained within a computer when the computer moves between AP devices within a network, and/or when the computer moves outside the network to connect to a different network.

SUMMARY

This invention provides user mobility in reconfiguring the network environment as a user moves to locations controlled by different AP devices within a wireless local area network (WLAN), or as the user moves to different locations not necessarily within the same WLAN. A system is provided that constantly scans the wireless network environment to detect changes in an existing AP device or the presence of a new AP device. The system automatically reconfigures the wireless hardware parameters and network configuration parameters when it detects changes in the quality of an established link by selecting a most suitable working profile in a profile database. By combining auto-sensing and the user profile management system, the system alleviates the need for users to manually adjust their configuration in order to communicate with a network when it encounters multiple AP environments.

In one aspect, the invention features a method to configure parameters after a computer is moved to a new location. The method includes steps of examining an established link for a need to establish a new link, establishing the new link by selecting a network profile from a plurality of network profiles stored in a profile database, the network profile containing a plurality of configuration parameters for establishing links, and reconfiguring parameters for a current network setting automatically without user input.

In another aspect, the invention is directed to an apparatus having a computer-readable storage medium tangibly embodying program instructions for configuring a computer after the computer is moved to a new location, the program instructions including instructions operable for causing a computer to examine an established link for a need to establish a new link. To establish the new link by selecting a network profile from a plurality of network profiles stored in a profile database, the network profile having a plurality of configuration parameters for establishing links, and reconfigure a current network setting.

In yet another aspect, the invention is directed to a computer readable memory which includes a reconfiguration apparatus consisting of a profile database to store a plurality of network profiles containing reconfiguration parameters for reconfiguring a network environment for a node in a network after the node is relocated to a different location. A detection process to examine the quality of an established link on a node, and a selector process, operatively coupled to the profile database to select in response to a signal from the detection unit, a next profile from the profile database for establishing a suitable network environment for the node. The plurality of network profiles may be stored by priority in the profile database.

In another aspect, the invention is directed to a computer readable memory which includes a reconfiguration apparatus having an auto-sensing process to detect changes in a network environment by checking for a connection, an AP device and a quality of the connection, and a user profile management process to step through automatically a plurality of parameters associated with a selected profile to communicated with the network based on plurality of parameters.

Various implementations of the invention may include one or more of the following features. The method where the examining step may be repeated once every three seconds. The establishing step may include testing each network profile from the plurality of network profiles until the new link is established. The establishing step may include establishing the new link with an access point including issuing a soft boot command or new link with a wireless card. The reconfiguring step may further consist of searching for a dynamic TCP/IP setting for a current location, and if found, releasing and renewing a current IP. It may receive and return packets from and to a wireless card driver. The program instructions further may have instructions to cause the computer to examine the established link once every three seconds, it may have instructions to cause the computer to test each network profile from the plurality of network profiles until the new link is established. The program instructions may have instructions to cause the computer to establish the new link with an access point by issuing a soft boot command or a new link with a wireless card. The program instruction may cause the computer to reconfigure and may search for a static TCP/IP setting for a current location, it may release a current IP, renew the current IP, and may receive and return packets from and to a wireless card driver. The reconfiguration parameters may have SSID, associated address and channel, IP address, subnet mask, and gateway. The parameters may further have a domain name and DNS address. The node may communicate with other nodes in the network through access points or in an ad hoc mode. The node may support encrypted information and the node may run in power saving mode.

Aspects of the invention can include one or more of the following advantages. A system is provided that eliminates the need for manual modifications of the WNIC hardware and network parameters when a node on the wireless network is moved. Manual reconfiguration of the parameters is a tedious process, and the automation of this process will undoubtedly increase the popularity of the use of WNIC's in the future. The system is versatile, in that, the automatic reconfiguration is not only provided when a node connects to a different AP device within the same network, but also when a node moves outside the network, or connects to the network without an AP device.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a schematic drawing of network configurations suitable for automatic reconfiguration of software/network connection parameters.

FIG. 2 is a block diagram illustrating the various interactions of the software and hardware components of the system of FIG. 1.

FIG. 3 is a screen shot of a reconfiguration dialog box.

FIG. 4(A) is a screen shot of the first of the two dialog boxes for adding a new profile.

FIG. 4(B) is a screen shot of the second of the two dialog boxes for adding a new profile.

FIG. 5 is a flow chart illustrating a method for automatically reconfiguring the parameters of a node in a LAN as it moves locations within or without the LAN.

FIG. 6 is a block diagram illustrating exemplary computer hardware components that constitute a suitable environment within which the principles of the present invention may be implemented and operated.

Like reference numbers and symbols in the various drawings indicate like elements.

DETAILED DESCRIPTION

Mobile computers can gain wireless access to network resources through the use of a Wireless Network Interface Card (WNIC). The WNIC's communicate with each other through radio waves, and some vendors can provide cards at a transmission rate as high as 11 Mbps, which is equal to or better than a thin Ethernet connection which typically transmits at 10 Mbps. The WNIC works in two modes: infrastructure mode and ad hoc mode.

In the infrastructure mode, a WNIC communicates with the network through Access Point (AP) devices. The AP device can communicate in both the wireless radio wave environment and the traditional Ethernet environment. Multiple WNIC's can communicate with each other through AP devices. In the ad hoc mode, the WNIC's can communicate with each other directly, but they cannot communicate with computers that have only Ethernet adapters. Operating in either mode, a WNIC provides a true wireless network access capability for mobile computers.

FIG. 1 illustrates network environments in which the method and apparatus of this invention can be used to reconfigure parameters as a mobile unit changes locations. In the implementation shown, a wireless network 100 consists of two cells, cell 110 and 112. In one implementation, the wireless network 100 is compliant with the Institute of Electrical and Electronics Engineers (IEEE) 802.11 standard, which allows for wireless integration with wired IEEE 802.3 Ethernet networks using devices called access points or base stations. The fundamental building block of the 802.11 architecture is the cell, also known as the basic service set (BSS) in 802.11 parlance. A cell typically includes one or more wireless stations and an access point. For example, cell 110 includes two wireless stations 114 and 116 and an AP device 118, and cell 112 includes the wireless stations 122 and 124 and an AP device 120. The nodes, or wireless stations, and the access point device communicate amongst themselves using the IEEE 802.11 wireless MAC protocol. Multiple AP devices may be connected together, either through a wired Ethernet or another wireless channel, to form a so-called distribution system (DS). The DS appears to upper level protocols (e.g., IP) as a single 802 network, in much the same way that a bridged, wired 802.3 Ethernet network appears as a single 802 network to the upper layer protocols. Here, the AP device 118 and AP device 120 are connected to the ports of hub 126, which is connected to LAN 128 and then to Internet 130. Hub 126 may support other computers not in network 100, such as independent server 148.

In a typical wireless computer network environment, nodes within the network are connected to one or more AP devices, such as WL 400 Wireless LAN Hardware Access Point available from Compaq Computer Corporation, to form one or more cells of wireless LAN coverage. IEEE 802.11 stations can also group themselves together to form an ad hoc network—a network with no central control and with no connections to the outside world. Here, the network is formed "on the fly," simply because there happen to be mobile devices that have found themselves in proximity to each other and sharing a mutual need to communicate without a pre-existing network infrastructure (e.g., a pre-existing 802.11 BSS with an AP) in the location. An ad hoc network might be formed, for example, when people with laptops meet together in a conference room, a train, or a car, and want to exchange data in the absence of a centralized AP. There has been a tremendous recent increase in interest in ad hoc networking, as communicating portable devices continue to proliferate.

In the infrastructure mode, an AP device typically includes a transceiver for communicating with at least one node in the wireless network. Once a reliable link between the AP device and the node is established, the node has access to the resources such as email, the Internet, file servers, printers, in the network. The principles of this invention will also apply to other types of networks, such as a home area network (HAN) 132. For example, the wireless station 124 can be taken away from the network 100 in the office to an employee's home, or HAN 132. The HAN 132 is a home network of two computers, wireless station 124 and desktop 134. In one implementation, wireless station 124 is wirelessly connected to AP device 136, forming cell 138. The AP device 136 is connected to the desktop 134 by cables 140 and 142 (e.g., Ethernet or unshielded twisted pair (UTP)) and through hub 144. Alternatively, desktop 134 and wireless station 124 can communicate in the ad hoc mode without hub 144 using WNICs as software versions of AP devices. While desktop 134 may provide server services for HAN 132, the two computers may also be connected as a peer-to-peer network, sharing cable modem 146 connecting HAN 132 to the Internet 130.

It should be noted that this implementation of the invention is described in terms of a network comprising AP devices connected to the Internet; however, principles of this invention can also be implemented in a network without AP devices and/or a hub, or a network not connected to the Internet.

FIG. 2 illustrates the communication path from a configuration module 200 to the driver of a WNIC 206 plugged into wireless station 124. The driver 204 acts like a translator between the WNIC 206 and configuration module 200. Each WNIC 206 has its own set of specialized commands that only its driver 204 knows. In contrast, most programs, including configuration module 200 accesses hardware devices by using generic commands. The driver 204, therefore, accepts generic commands from configuration module 200 and then translates them into specialized commands for the WNIC 206. User library 202 contains specially written functions for configuration module 200. In one implementation, User Library 202 is a dynamic link library.

FIG. 3 illustrates a dialog box 300 that appears on the screen of wireless station 124 after a user moves the physical location of station 124 to outside of wireless network 100. Prior to establishing a link, a profile descriptor must be set and the user may manually enter different profiles by pushing the Add button 316 to connect to dialog boxes 400 and 450 of FIGS. 4(A) and 4(B) respectively before starting the automatic configuration module 200 to reconfigure the WNIC hardware and network parameters for connecting to a new host. Similarly the user may use the Remove button 318 to remove a profile, or the Edit/View button 320 to edit a profile. The user may also force connection to a profile highlighted in the Location Listing 324 section by pushing the Apply button 322. Each profiled AP device in the profile database is shown in the Location Listing section 324. The project management may give a brief description of the location of the AP device to be associated with the AP device's Single Session Identification (SSID).

Dialog box 300 shows the connection status of the current connection. The name of the current SSID 302 is Dreamspace, representing the string that uniquely describes an AP device currently in use. In order for a group of AP devices to work together, they must each have unique SSID. In one implementation, each AP device will utilize one channel between the numbers 1 and 11. In the example shown here, AP device Dreamspace is shown in box 306 to operate in channel 7. The choice of the channel of an AP device is set by the administrator of the AP device.

Box 308 represents the transfer speed at which the current AP is talking to the client. Normally, the transfer speed can be 1, 2, 5.5, or 11 Mbps (mega bits per second). Basically the farther the AP device is from the client, the weaker the incoming signals are and the slower the speed becomes. The AP devices can automatically reduce the speed when the signals can no longer be transmitted at the current speed effectively. The client can choose "Auto" as the value of transfer speed in box 308 to allow automatic speed selection by the AP device. Alternative, the client can fix the speed by setting a value of box 308 to command the AP device to communicate at a fixed speed.

The quality of the current link is shown in box 312 as a percentage value; 0% implies that there is no connection. Similarly, the strength of incoming signals is shown in box 314 as a percentage value.

In one implementation, the system provides a software utility that constantly scans the wireless network environment for the presence of a new change. The software utility may reside in configuration module 200. The utility automatically reconfigures the wireless hardware parameters and network configuration parameters in a node when the utility detects changes in the network environment. The automatic switching is made possible by the introduction of profiles. The utility selects the most desirable working profile provided by the user for new parameters when an existing profile is no longer compatible. This invention also may support power saving mode, the status of which is shown in box 306. The wireless AP devices have the ability to run in power saving mode to stop transmitting anything unless there is outgoing data or an incoming signal from the AP device. This mode prolongs battery life.

Each profile will enable the WNIC to establish a connection with the first compatible AP device in the network located by the WNIC. In one implementation, the AP device is located by an autosensing component that transmits profile parameters and waits for verification by compatible AP devices. For each profile, a set of hardware and software/network parameters will be entered into the profile database. Profiles within the profile database may be prioritized or placed in sequential order. Hardware parameters include, but not limited to, SSID, channel, network type, network translation, encryption status, etc. Dialog box 400 can be used to enter hardware parameters as is shown in FIG. 4(A).

Dialog box 400 provides box 400 for the user to associate a unique name with an AP device. Box 402 provides a brief description of the location of the AP device, such as at home or in office X. The user can identify the connection as to an AP device in infrastructure mode in circle 406, or to another wireless card in ad hoc mode in circle 408. Transfer speed supported is specified in box 410, and translation status in box 410. Box 410 refers to the encapsulation of the header in the network transport layer. When you transmit a continuous stream of data over the net, such as a file, it is broken into many small chunks of data, such as 1514 bytes each. Each chunk is referred to as a packet. Each packet will contain a header to describe the source, destination, routing, protocol and data. Encapsulation or translation describes the standard used the wrap the header. The sample value provided in box 412 is Request for Comments (RFC) 1042. Encryption of data is supported if box 414 is selected.

Software/network parameters that can be specified by the user include, but are not limited to, IP address, network mask, and DNS setting. Network parameters are entered into the profile database by filling in dialog box 450 of FIG. 4(B). This invention supports dynamic IP address assigned by a Dynamic Host Configuration Protocol (DHCP) server (box 462), or a permanent IP address assigned by the network administrator (box 466). The IP address is written as four sets of numbers separated by periods, for example 192.168.40.3 of box 452. The Subnet mask follows the same format, for example 255.0.0.0 in box 454. The subnet mask helps to identify the computer on the Internet and is determined in part by the IP address value in box 452. The identification of the default gateway is entered into box 456 to identify the device on the network that facilitates communication with the Internet 130. The Domain Name System (DNS) translates host name in box 458 and domain name in box 460 into the numeric IP address. DNS service search order is shown in box 464.

This invention addresses the complicated issues of detecting the current wireless network environment and configuring new wireless hardware and network parameters. The detection of the wireless network environment is accomplished by introducing an auto-sensing algorithm. The establishment of a new wireless hardware and network configuration is done through a profile based user/AP device management system. The flow chart of FIG. 6 illustrates how the autosensing algorithm works with the user profile management system to achieve the dynamic reconfiguration effects, is composed of the checking processes in the left column of the flow chart.

The autosensing algorithm starts (step 500) by establishing (step 502) a connection to a selected AP device by sending the parameters associated with the AP device to the driver and issuing a soft boot command to the driver. The selection process may be automatic according to the priorities set in the profile database in one implementation, or the selection process may be done manually by highlighting one of the selections available under the Location Listing section 324 in other implementations. The system will step through the parameters stored in the associated profile in the profile database and communicate with the network based on the selected profile. If the communication is successful, the system will use that profile as the current configuration. Otherwise, it will go to the next profile (step 506) and repeat the same process by going back to step 502. If the system is still connected to the same network/AP device (step 508) as prior to taking the establishing step, and the link quality is still good (step 510), the system sleeps, in one implementation, for three seconds before checking the link quality again. If the link quality is not good, the system returns to step 502 to try to establish another connection.

If, on the other hand, the connection is now to a different AP device, the TCP/IP settings of the location associated with this AP device are examined (step 514) to reconfigure current network settings. If the TCP/IP settings are static (step 516), the Dynamic Host Configuration Protocol (DHCP) incorporates a much more robust dialogue during lease negotiation. DHCP has seven possible message types that can be used during the IP address assignment sequence. When a DHCP device, such as wireless station 124, attaches itself to the network for the first time, it broadcasts a DHCPDISCOVER packet. A DHCP server on the local segment will see the broadcast and return a DHCPOFFER packet that contains an IP address and other information. The servers may or may not conduct some sort of preliminary testing prior to offering the address to see if the address is already in use by another node somewhere. The client may receive multiple DHCPOFFER packets from any number of servers, so it must choose between them, and broadcast a DHCPREQUEST packet that identifies the explicit server and lease offer that it likes the best. Assuming that the offer is still valid, the chosen server would return a DHCPACK that tells the client the lease is finalized. Therefore, the system waits for DHCPREQUEST packet on the Wireless card driver, releases current IP, and renews current IP by sending a DHCPACK packet to complete the renewing IP process. DHCP provides a framework for passing configuration information to host computers on a TCP/IP network and a detailed description of DHCP is provided in RFC 1541, available at http://www.cis.ohio.state.edu/htbin/rfc/rfc1541.html, and the entire disclosure of which is incorporated herein by reference.

If the TCP/IP setting is dynamic (step 518), the system simply releases current IP and renews current IP without going through the negotiation process.

Through this process of combining autosensing process and profile-based AP management system, users will know when a new AP or network connection is available or the existing AP is not available anymore.

Referring to FIG. 6, it illustrates a block diagram of an exemplary computer (generally designated 600) that may provide a suitable environment within which the principles of the present invention may be implemented and operated. Since the present invention is not limited to application in any particular processing environment, FIG. 6 is illustrative only. Moreover, the principles of the present invention are usable in processing environments other than computer systems, such as data communication (e.g., wired and wireless public and private communication networks) and multimedia networks. Exemplary computer 600 illustratively includes processing circuitry 602 (e.g., at least one conventional processor), conventional volatile memory such as random access memory 605 and read only memory 610, CPU bus controller circuitry 615, a non-volatile memory (e.g., a removable hard disk drive) 620 controlled by I/O controller 625 via I/O bus 630. Exemplary CPU bus 615 is suitably operative to associate processing circuitry 602, volatile memories 605 and 610, and I/O controller circuitry 625. While exemplary I/O bus 630 is suitably operative to associate I/O controller circuitry 625, non-volatile memory 620, display device 635 and keyboard 640, or more of a plurality of conventional peripheral devices for communication therewith.

A number of embodiments of the invention have been described. Nevertheless, it will be understood that various modifications may be made without departing from the spirit and scope of the invention. Accordingly, other embodiments are within the scope of the following claims.

What is claimed is:

1. A method for establishing communication between a wireless station and a network, the method comprising:
    establishing a plurality of network profiles in a profile database of the wireless station comprising displaying a dialog box to a user, wherein the plurality of network profiles in the profile database is prioritized, wherein the user manually enters the network profiles into the profile database using the dialog box, wherein user entered data available to be entered by the user comprises an SSID, a mode of operation selected from either ad hoc or infrastructure, whether traffic should be scrambled for privacy, encapsulation or translation to be used to wrap the header, IP address, subnet mask, and DNS setting;
    establishing a first link using a network profile of the network profiles;
    periodically examining the first link for a need to establish a new second link;
    determining that link quality of the first link indicates that the second link is needed; and
    establishing the second link comprising:
        selecting another network profile of the network profiles without requiring the user to manually select the another network, profile; and
        reconfiguring parameters automatically in accordance with the another network profile.

2. The method of claim 1 wherein the first link is established with a first access point device.

3. The method of claim 2 wherein the second link is established with a second access point device.

4. The method of claim 1 wherein the establishing the second link further comprises issuing a command to a driver of a wireless card of the wireless station to establish the second link, wherein upon establishing the second link, the second link is an established link and the first link is a previous link.

5. The method of claim 4 further comprising periodically examining the established link for a need to establish a new link, the new link being different from the established link.

6. The method of claim 5 further comprising pausing the periodic examination upon a determination that the link quality is good.

7. The method of claim 6 wherein the periodic examination is paused for three seconds.

8. The method of claim 5 wherein the periodic examination is repeated once every three seconds.

9. The method of claim 5 further comprising determining whether an access point device used for the established link is a same access point device used for the previous link.

10. The method of claim 9 wherein upon a determination that the access point device used for the established link is not the same access point device used for the previous link, the method further comprising:
determining whether the TCP/IP setting for the access point device used for the established setting is static or dynamic.

11. The method of claim 10 wherein upon a determination that the TCP/IP setting is static, the method further comprising:
releasing a current IP; and
renewing the current IP.

12. The method of claim 10 wherein upon a determination that the TCP/IP setting is dynamic, the method further comprising:
releasing a current IP;
renewing the current IP; and
receiving and returning packets from and to a wireless card driver.

13. The method of claim 1 wherein the user uses the dialog box to associate unique names to access point devices of the network profiles.

14. The method of claim 1 wherein the user uses the dialog box to enable power saving mode.

15. The method of claim 1 wherein the user uses the dialog box to set transfer speeds for communicating with access point devices of the network profiles.

16. An apparatus comprising:
a processor;
a memory comprising program instructions, wherein execution of the program instructions by the processor generates a method comprising:
establishing a plurality of network profiles in a profile database comprising displaying a dialog box to a user, wherein the plurality of network profiles in the profile database is prioritized, wherein the user manually enters the network profiles into the profile database using the dialog box, wherein user entered data available to be entered by the user comprises an SSID, a mode of operation selected from either ad hoc or infrastructure, whether traffic should be scrambled for privacy, encapsulation or translation to be used to wrap the header, IP address, subnet mask, and DNS setting;
establishing a first link using a network profile of the network profiles;
periodically examining the first link for a need to establish a new second link;
determining that link quality of the first link indicates that the second link is needed; and
establishing the second link comprising:
selecting another network profile of the network profiles without requiring the user to manually select the another network profile; and
reconfiguring parameters automatically in accordance with the another network profile.

17. The apparatus of claim 16 wherein the establishing the second link, further comprises issuing a command to a driver of a wireless card to establish the second link, wherein upon establishing the second link, the second link is an established link and the first link is a previous link.

18. The apparatus of claim 17 wherein the method further comprises periodically examining the established link for a need to establish a new link, the new link being different from the established link.

19. The apparatus of claim 18 further comprising pausing the periodic examination for three seconds upon a determination that the link quality is good.

20. A computer program product comprising a nontransitory computer readable storage medium comprising computer code comprising:
a configuration module for establishing a plurality of network profiles in a profile database of the wireless station comprising displaying a dialog box to a user, wherein the plurality of network profiles in the profile database is prioritized, wherein the user manually enters the network profiles into the profile database using the dialog box, wherein user entered data available to be entered by the user comprises an SSID, a mode of operation selected from either ad hoc or infrastructure, whether traffic should be scrambled for privacy, encapsulation or translation to be used to wrap the header, IP address, subnet mask, and DNS setting;
the configuration module further for establishing a first link using a network profile of the network profiles;
the configuration module further for periodically examining the first link for a need to establish a new second link;
the configuration module further for determining that link quality of the first link indicates that the second link is needed; and
the configuration module further for establishing the second link comprising:
selecting another network profile of the network profiles without requiring the user to manually select the another network profile; and
reconfiguring parameters automatically in accordance with the another network profile.

* * * * *